United States Patent
Smith et al.

(10) Patent No.: US 11,327,148 B2
(45) Date of Patent: May 10, 2022

(54) LOCATION DETECTION USING A SINGLE BEACON

(71) Applicant: International Business Machines Corporation, Armonk, NY (US)

(72) Inventors: Samuel Smith, Eastleigh (GB); Alexander J. Naylor, Newbury (GB); Aaron T. R. Gashi, Eastleigh (GB); Oliver Masters, Birmingham (GB)

(73) Assignee: International Business Machines Corporation, Armonk, NY (US)

( * ) Notice: Subject to any disclaimer, the term of this patent is extended or adjusted under 35 U.S.C. 154(b) by 514 days.

(21) Appl. No.: 16/542,467

(22) Filed: Aug. 16, 2019

(65) Prior Publication Data
US 2020/0150212 A1    May 14, 2020

Related U.S. Application Data

(63) Continuation of application No. 16/190,213, filed on Nov. 14, 2018.

(51) Int. Cl.
*G01S 5/02* (2010.01)
*G01S 1/02* (2010.01)
*G01S 5/14* (2006.01)

(52) U.S. Cl.
CPC ............ *G01S 5/0289* (2013.01); *G01S 1/024* (2013.01); *G01S 5/0242* (2013.01); *G01S 5/14* (2013.01)

(58) Field of Classification Search
CPC ...... G01S 5/0289; G01S 1/024; G01S 5/0242; G01S 5/14
See application file for complete search history.

(56) References Cited

U.S. PATENT DOCUMENTS

| | | | |
|---|---|---|---|
| 9,357,346 B2 | 5/2016 | Jagannath | |
| 9,557,178 B2 | 1/2017 | Ghose et al. | |
| 9,797,984 B2 | 10/2017 | Elias | |
| 2014/0180627 A1 | 6/2014 | Naguib et al. | |
| 2017/0168135 A1* | 6/2017 | Want | H04W 4/33 |

(Continued)

FOREIGN PATENT DOCUMENTS

| | | |
|---|---|---|
| KR | 101344408 B1 | 12/2013 |
| WO | 2017180503 A1 | 10/2017 |

OTHER PUBLICATIONS

Locatify, "Indoor Positioning Systems based on BLE Beacons—Basics", printed Aug. 27, 2018, 7 pages https://locatify.com/blog/indoor-positioning-systems-ble-beacons/.

(Continued)

*Primary Examiner* — Manuel A Rivera Vargas
(74) *Attorney, Agent, or Firm* — Daniel M. Yeates

(57) ABSTRACT

Disclosed is a method of location identification using a single beacon. The method comprises determining a first distance between a beacon and a first sensor, where the first sensor is embedded in a mobile device. It also includes determining a second distance between the beacon and a second sensor, where the second sensor is embedded in the mobile device. The method also includes defining a vector, where the vector has a magnitude equal to the distance between the first and second sensor, and a direction pointing from the first sensor to the second sensor. The method further includes calculating a plurality of potential locations. The method then determines the actual location.

10 Claims, 6 Drawing Sheets

(56) References Cited

U.S. PATENT DOCUMENTS

2018/0067187 A1    3/2018  Oh et al.
2019/0362517 A1*  11/2019  Miyamoto .............. G06T 19/00
2020/0150212 A1*   5/2020  Smith ....................... G01S 5/14

OTHER PUBLICATIONS

Vasisht et al., "Decimeter-Level Localization with a Single WiFi Access Point", USENIX The Advanced Computing Systems Association, This paper is included in the Proceedings of the 13th USENIX Symposium on Networked SystemsDesign and Implementation, Mar. 16-18, 2016, 15 pages.

Zou et al., "Accurate Indoor Localization and Tracking Using Mobile Phone Inertial Sensors, WiFi and iBeacon", 2017 IEEE International Symposium on Inertial Sensors and Systems, Mar. 27-30, 2017, 4 pages.

Hanssens et al., "An Indoor Variance-Based Localization Technique Utilizing the UWB Estimation of Geometrical Propagation Parameters", IEEE Transactions on Antennas and Propagation, vol. 66, No. 5, May 2018, pp. 2522-2533.

Smith et al., "Location Detection Using a Single Beacon", U.S. Appl. No. 16/190,213, filed Nov. 14, 2018.

List of IBM Patents or Patent Applications Treated as Related, dated Aug. 13, 2019, 2 pages.

\* cited by examiner

LOCATION DETECTION USING A SINGLE BEACON

BACKGROUND

The present disclosure relates to location detection, and, more specifically, to indoor location detection.

There have been several methods developed to determine the location of objects in a certain space. Several different techniques are used, depending on the application, to determine an object's location. Systems such as the Global Positioning System (GPS), Loran-C, and others utilize methods such as triangulation, trilateration, and multilateration to determine location. However, each of these techniques generally utilize multiple beacons or nodes to provide an accurate location, and these techniques are generally ineffective in determining indoor locations. Determining locations of objects in indoor locations is challenging, especially when the indoor location is a multi-story building.

SUMMARY

Disclosed is a computer-implemented method of indoor location identification. The method comprises determining a first distance between a beacon and a first sensor, where the first sensor is embedded in a mobile device. It also includes determining a second distance between the beacon and a second sensor, where the second sensor is embedded in the mobile device. The method also includes defining a vector, where the vector has a magnitude equal to the distance between the first and second sensor, and a direction pointing from the first sensor to the second sensor. The method further includes calculating a plurality of potential locations. The method then determines the actual location. A system and computer program product to carry out the above method is also disclosed.

The present Summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
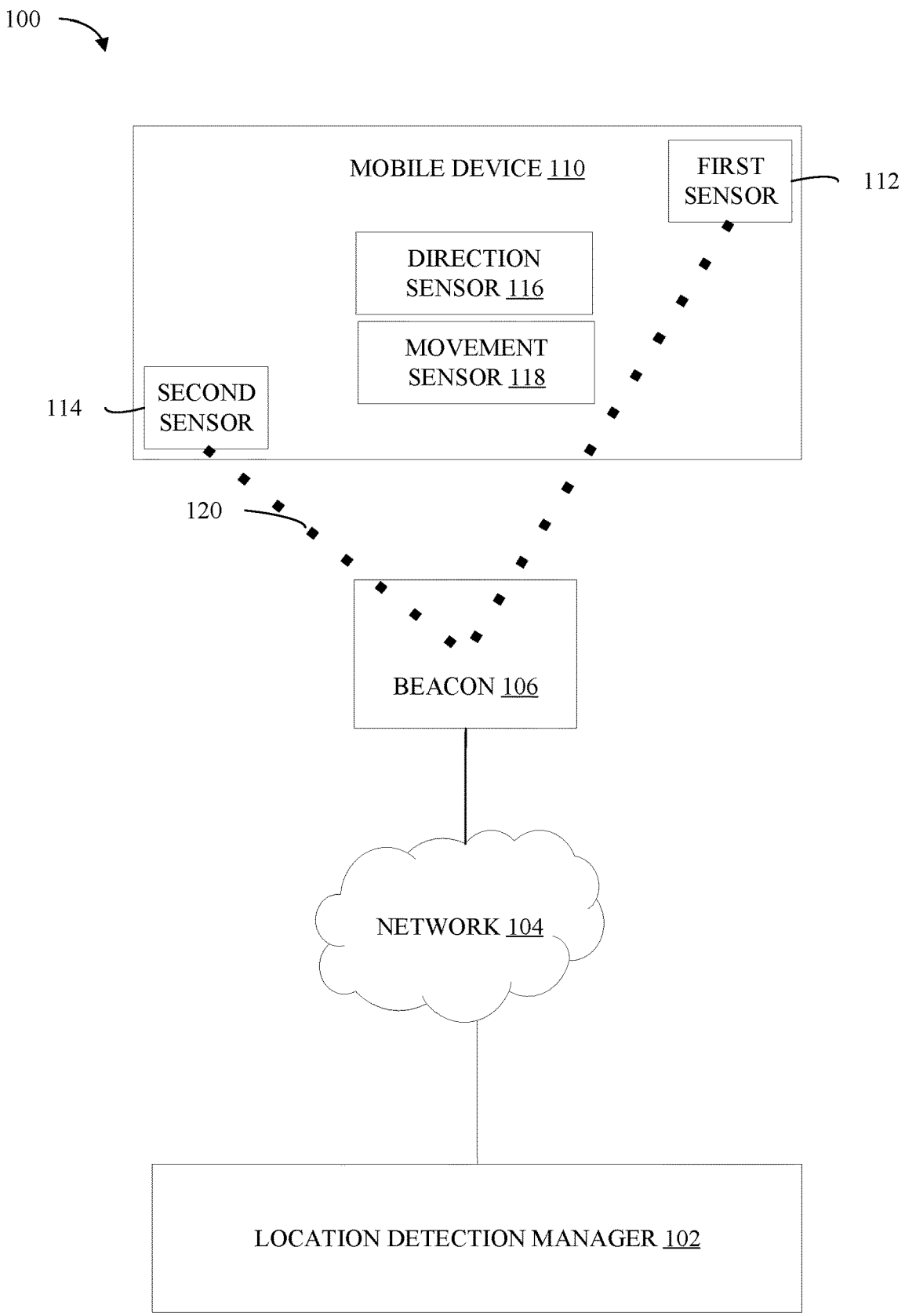
FIG. 1 illustrates a computing environment suitable for operation of a location detection manager.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward location identification, and, more specifically, to indoor location identification using a single beacon.

Location identification is the process of determining the location of an object relative to some other object. Several techniques have been developed to help people determine the location of objects. Examples of these systems include maps and star charts. More modern systems can use a complex network of sophisticated equipment to determine location. Two examples are global positioning system (GPS) (i.e. a series of satellites orbiting earth) and cellular networks. GPS can provide geolocation information to a GPS receiver anywhere on or near the earth, so long as there is an unobstructed line of sight to several GPS satellites. Cellular networks can use GPS, triangulation, and other similar methods in location identification.

However, GPS and cellular signals can be blocked by structures making them less effective when the receiver is indoors. Additionally, traditional systems are generally designed to determine a location on a two-dimensional plane.

Embodiments of the present disclosure provide for indoor location identification and navigation using a single beacon. In these embodiments, a portable device can include two sensors, a compass, and an accelerometer. The distance between the beacon and the two sensors, coupled with the compass can be used to determine the potential locations of the portable device relative to the beacon. An algorithm is used to determine which of the possible locations are the most likely to be the actual location of the portable device.

For purposes of the present disclosure, a beacon is a device that can send and receive data (e.g. a wireless router) to a separate device (e.g. a smart phone). A sensor is a device, typically installed as a component in a computing device, that can form a connection with a beacon to send and receive data from a device (e.g. a wireless adapter or wireless card).

Typical indoor positioning systems require more than one beacon. Embodiments of the present disclosure recognize there have been several attempts to remedy indoor location identification and navigation. However, these techniques all require the use of two or more beacons.

Embodiments of the present disclosure recognize placing additional beacons in a building is not feasible in all situations. Older buildings can be retrofitted with additional beacons; however, retrofitting buildings with additional beacons can be expensive and time-consuming. Even in new buildings, installing multiple beacons increases the initial building cost and subsequent maintenance cost. Thus, embodiments of the present disclosure can provide accurate indoor location identification for any device in range of a wireless signal using a single beacon. Furthermore, embodiments of the present disclosure allow for location identification using a previously installed beacon, thereby reducing the need to retrofit buildings with additional beacons.

Embodiments of this disclosure recognize traditional location identification techniques are less effective or wholly inadequate when applied to indoor settings. In contrast, embodiments of the present disclosure can detect the precise location of the device in an indoor setting.

The aforementioned advantages are example advantages, and embodiments exist that can contain all, some, or none of the aforementioned advantages while remaining within the spirit and scope of the present disclosure.

Referring now to various embodiments in more detail, FIG. 1 is a functional block diagram of a computing environment, generally designated 100, suitable for operation of an indoor location identification program in accordance with at least one embodiment of the disclosure. FIG. 1 provides an illustration of an implementation and does not imply any limitation with regard to the environments in which different embodiments may be implemented. Many modifications of the depicted environment may be made by those skilled in the art without departing from the spirit and scope of the present disclosure.

Computing environment 100 includes location detection manager 102, network 104, beacon 106, mobile device 110, and wireless connection 120.

Location detection manager 102 can be a standalone computing device, a management server, a web server, a mobile computing device, or any other electronic device or computing system capable of receiving, sending, and processing data. In other embodiments, location detection manager 102 can represent a server computing system utilizing multiple computers as a server system, such as in a cloud computing environment. In an embodiment, location detection manager 102 represents a computing system utilizing clustered computers and components (e.g., database server computers, application server computers, etc.) that act as a single pool of seamless resources when accessed within computing environment 100. In some embodiments, location detection manager 102 includes instructions on how to determine the location of a mobile device by use of a single beacon. Location detection manager 102 may include internal and external hardware components, as depicted and described in further detail with respect to FIG. 4. In some embodiments, location detection manager 102 may be run on mobile device 110.

Network 104 can be, for example, a telecommunications network, a local area network (LAN), a wide area network (WAN), such as the Internet, or a combination of the three, and can include wired, wireless, or fiber optic connections. Network 104 may include one or more wired and/or wireless networks that are capable of receiving and transmitting data, voice, and/or video signals, including multimedia signals that include voice, data, and video information. In general, network 104 may be any combination of connections and protocols that will support communications between location detection manager 102, beacon 106, mobile device 110, and other computing devices (not shown) in computing environment 100.

Beacon 106 is a device that can wirelessly connect with mobile device 110. In some embodiments the wireless connection allows for the transfer of data both to and from mobile device 110. In these embodiments, beacon 106 is capable of receiving and transmitting data, voice, and/or video signals, including multimedia signals that include voice, data, and video information to and from mobile device 110 via wireless connection 120. In some embodiments, beacon 106 can be a wireless router. A wireless router is a device that performs the function of a router (a network device that forwards data packets between devices in a network) and also includes the function of a wireless access point to a network. In some embodiments, beacon 106 can transmit and receive signals at multiple different frequencies (e.g. 2.412 GHz, 2.462 GHz, 5.18 GHz, etc.) In some embodiments, beacon 106 can switch which frequency it is using to send and collect data while maintaining a wireless connection with a device, such as mobile device 110.

Mobile device 110 represents any programmable electronic device or combination of programmable electronic devices capable of executing machine readable program instructions and communicating with other computing devices (not shown) within computing environment 100 via a network, such as network 104 or wireless connection 120. Mobile device 110 may be a laptop computer, tablet computer, smartphone, smartwatch, household appliance (e.g., automated vacuum cleaner, security sensor, etc.), vehicle (e.g., automobile, unmanned aerial vehicle, etc.) or any programmable electronic device capable of communicating with various components and devices within computing environment 100, via network 104 or wireless connection 120.

Mobile device 110 further includes first sensor 112, second sensor 114, direction sensor 116 (also referred to as a direction(al) device herein), and movement sensor 118 (also referred to as a movement device herein).

First sensor 112 can be any component capable of completing a wireless connection with beacon 106. In some embodiments, the connection is complete when data can be transferred between first sensor 112 and beacon 106. In these embodiments, first sensor 112 is capable of receiving and transmitting data, voice, and/or video signals, including multimedia signals that include voice, data, and video information to beacon 106 via wireless connection 120.

In some embodiments, first sensor 112 can be a Wi-Fi antenna. A Wi-Fi antenna is a device capable of connecting to a wireless network via a wireless router. The Wi-Fi antenna is also capable of sending and receiving signals to and from beacon 106.

Second sensor 114 can be any component capable of completing a wireless connection with beacon 106. In some embodiments, second sensor 114 can be consistent with first sensor 112. In some embodiments, second sensor 114 is located in mobile device 110 to increase the distance from first sensor 112 to the greatest extent that is practical. In some embodiments, second sensor 114 is situated in a corner opposite of first sensor 112. In some embodiments, first sensor 112 and second sensor 114 are separated by a distance of at least two inches.

Direction sensor 116 is a sensor that can determine the orientation of mobile device 110. In some embodiments, the orientation is determined relative to earth's magnetic field. In some embodiments, the orientation is determined relative to beacon 106. In some embodiments, direction sensor 116 is a compass. In some embodiments, direction sensor 116 includes a gyroscope or an electronic equivalent. In some embodiments, direction sensor 116 is multiple components (e.g. a compass and a gyroscope) working in unison.

Movement sensor 118 is a device used to measure the acceleration forces of mobile device 110. In some embodiments, movement sensor 118 can be an accelerometer. In some embodiments, movement sensor 118 can include a gyroscope. In some embodiments, movement sensor 118 includes an accelerometer and a gyroscope working in unison. In some embodiments, movement sensor 118 dynamically senses movement of mobile device 110. For example, movement sensor 118 can sense when the device is moving relative to beacon 106 (i.e. a person carrying a smartphone and walking). In some embodiments, movement sensor 118 can sense rotational movement (i.e. a smartphone being rotated in a fixed location.)

Wireless connection 120 represents a data connection between beacon 106 and first sensor 112 and between beacon 106 and second sensor 114. Wireless connection 120 may include one or more wireless networks that are capable of receiving and transmitting data, voice, and/or video signals, including multimedia signals that include voice, data, and video information. In general, wireless connection 120 may be any combination of connections and protocols that will support wireless communication between beacon 106 and first sensor 112, and between beacon 106 and second sensor 114.

Figure 2:
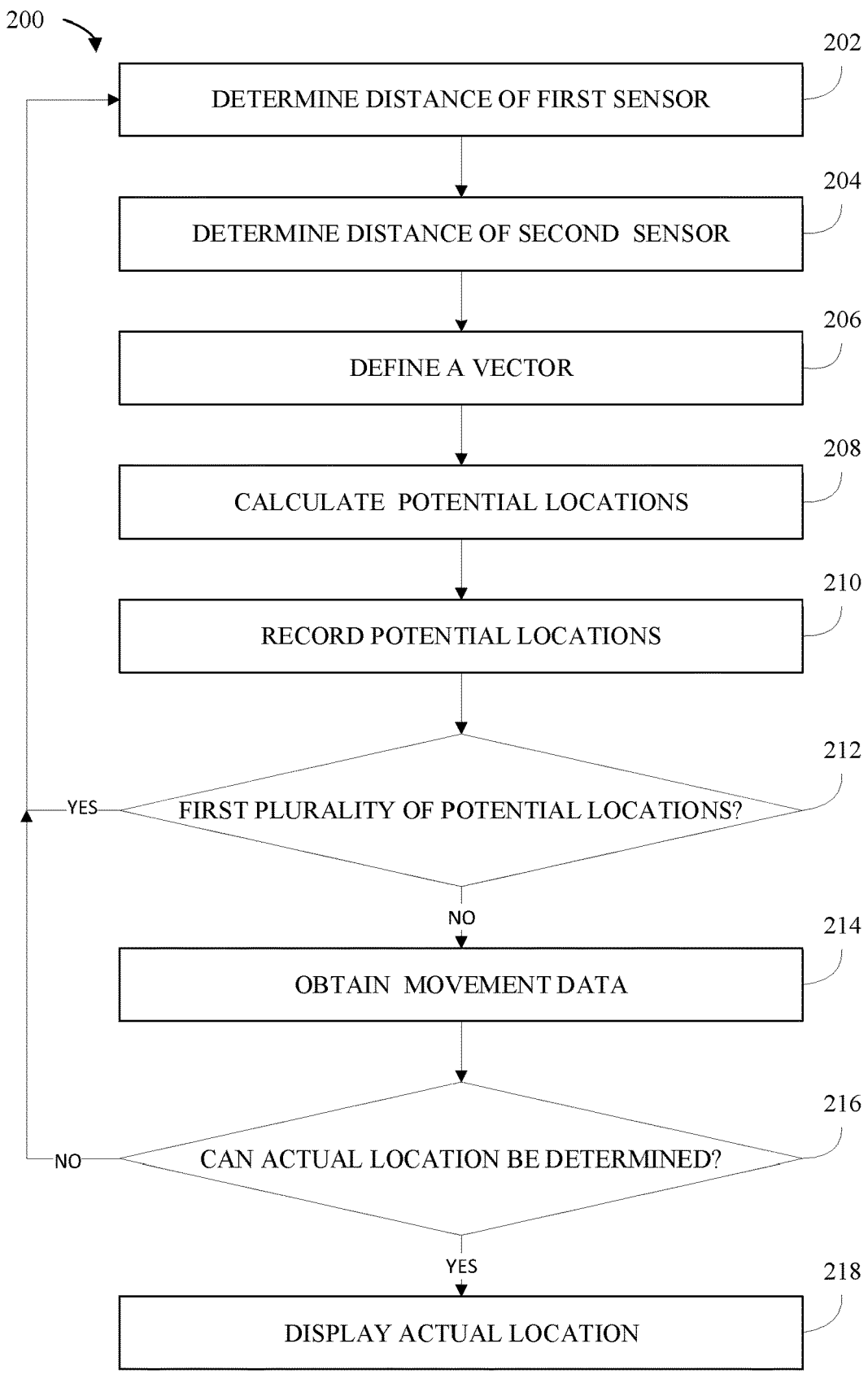
FIG. 2 is a flow chart depicting operational steps to determine to location of a device.

FIG. 2 depicts a flowchart of an example method that can be performed by location detection manager 102. Method 200 can include more or fewer operations than those operations that are explicitly depicted. Method 200 can include operations in different orders than those orders depicted. Likewise, the method 200 can include operations that occur simultaneously rather than sequentially. Many modifications to the depicted method may be made by those skilled in the art without departing from the spirit and scope of the present disclosure. Method 200 can be implemented by one or more processors, location detection manager 102 of FIG. 1, mobile device 310 of FIGS. 3A-3C, location detection manager 400 of FIG. 4, or a different combination of hardware and/or software. For clarity, the method 200 is described as being implemented by location detection manager 102.

At 202, location detection manager 102 determines a first distance, wherein the first distance is the distance between beacon 106 and first sensor 112. In some embodiments, the distance is measured as an absolute value (i.e. a distance with no direction.) In these embodiments it can be assumed that beacon 106 is at the origin. The origin is a fixed point of reference from which all other points may be compared. In some embodiments, the first distance is determined using decimeter level localization with a single access point.

In some embodiments the first distance is determined by measuring the time of flight. The time of flight is the time it takes a signal to travel between beacon 106 and first sensor 112. In some embodiments the first distance is calculated by multiplying the time of flight by the speed of light. In some embodiments, measuring the time of flight includes resolving phase offsets. In some embodiments, measuring the time of flight includes combating multipath or said differently, accounting for the multiple paths a signal may travel. In some embodiments, measuring the time of flight includes eliminating packet detection delay.

In some embodiments, the time of flight is measured by transferring data at multiple frequencies between beacon 106 and first sensor 112. As a signal propagates it accumulates a corresponding phase based on its frequency. Therefore, time of flight can be a function of frequency and phase. Because the data is transferred by electromagnetic waves, there are multiple potential times of flight for each frequency. In some embodiments, the time of flight is measured by solving for the time of flight for multiple frequencies and determining the time that corresponds to more than one frequency. The time of flight that is a solution to each frequency correlates to the actual time of flight.

Embodiments of the present disclosure recognize that there can be multiple paths a signal can travel from beacon 106 to first sensor 112. Thus, in some embodiments, the first distance is measured by determining a time of flight for a plurality of signal paths. In these embodiments, the signal path with the shortest time of flight (i.e. a straight line) can be used to determine the first distance.

At 204, location detection manager 102 determines a second distance, wherein the second distance is the distance between beacon 106 and second sensor 114. In some embodiments, determining the second distance can be consistent with determining the first distance.

Figure 3A:
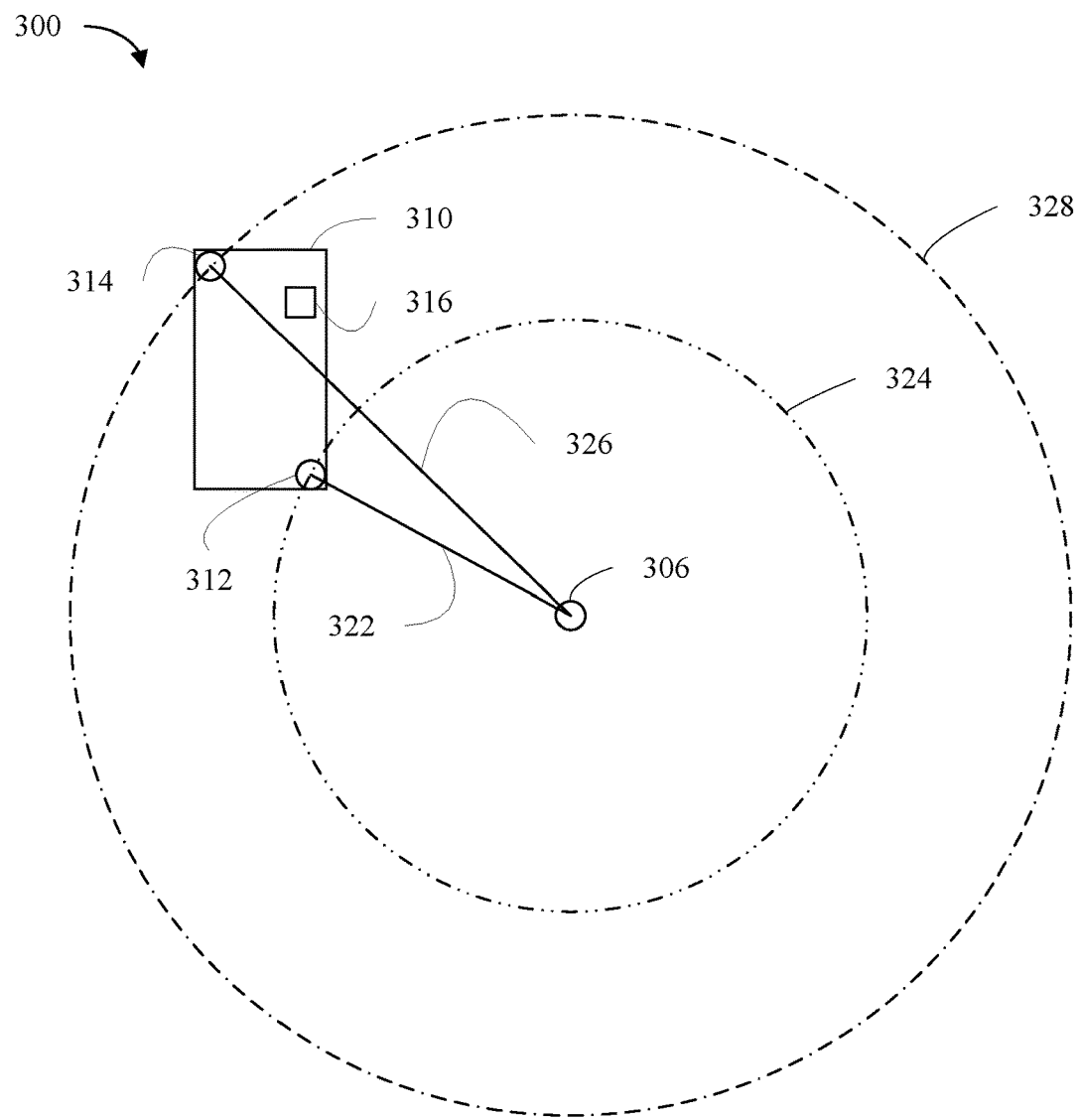
FIG. 3A is a visual representation of various operations of FIG. 2.

FIG. 3A shows a representation of the distances being calculated in operations 202 and 204 of FIG. 2. FIG. 3A includes beacon 306, mobile device 310, first sensor 312, second sensor 314, direction sensor 316, first distance 322, first circle 324, second distance 326, and second circle 328. Beacon 306, mobile device 310, first sensor 312, second sensor 314, and direction sensor 316 can be consistent with beacon 106, mobile device 110, first sensor 112, second sensor 114, and direction sensor 116 of FIG. 1, respectively.

First distance 322 represents the distance between beacon 306 and first sensor 312. First distance 322 can be represented as $\|p\|$. The term $\|p\|$ represents a positive value and has no direction. First circle 324 is a circle created if beacon 306 is at the origin and $\|p\|$ is the radius of the circle. It follows, knowing the distance $\|p\|$, first sensor 312 is located at a point on first circle 324. The location of first sensor 312, relative to beacon 306 can be represented by p.

Second distance 326 represents the distance between beacon 306 and second sensor 314. Second distance 326 can be represented as $\|q\|$. The term $\|q\|$ represents a positive value and has no direction. Second circle 328 is a circle created if beacon 306 is at the origin and $\|q\|$ is the radius of the circle. It follows, knowing the distance $\|q\|$, second sensor 314 is located at a point on second circle 328. The location of second sensor 314, relative to beacon 306 can be represented by q.

Referring again to FIG. 2, at 206, location detection manager 102 defines a vector. In some embodiments the vector starts at first sensor 312 and ends at second sensor 314. In some embodiments, the vector includes two parts, a direction and a magnitude. In some embodiments, the magnitude is defined as the distance between first sensor 112 and second sensor 114. In some embodiments, the direction is defined based on input from direction sensor 116. In some embodiments, the direction is defined based on input from a compass and defines the direction relative to the direction the compass is pointing.

Figure 3B:
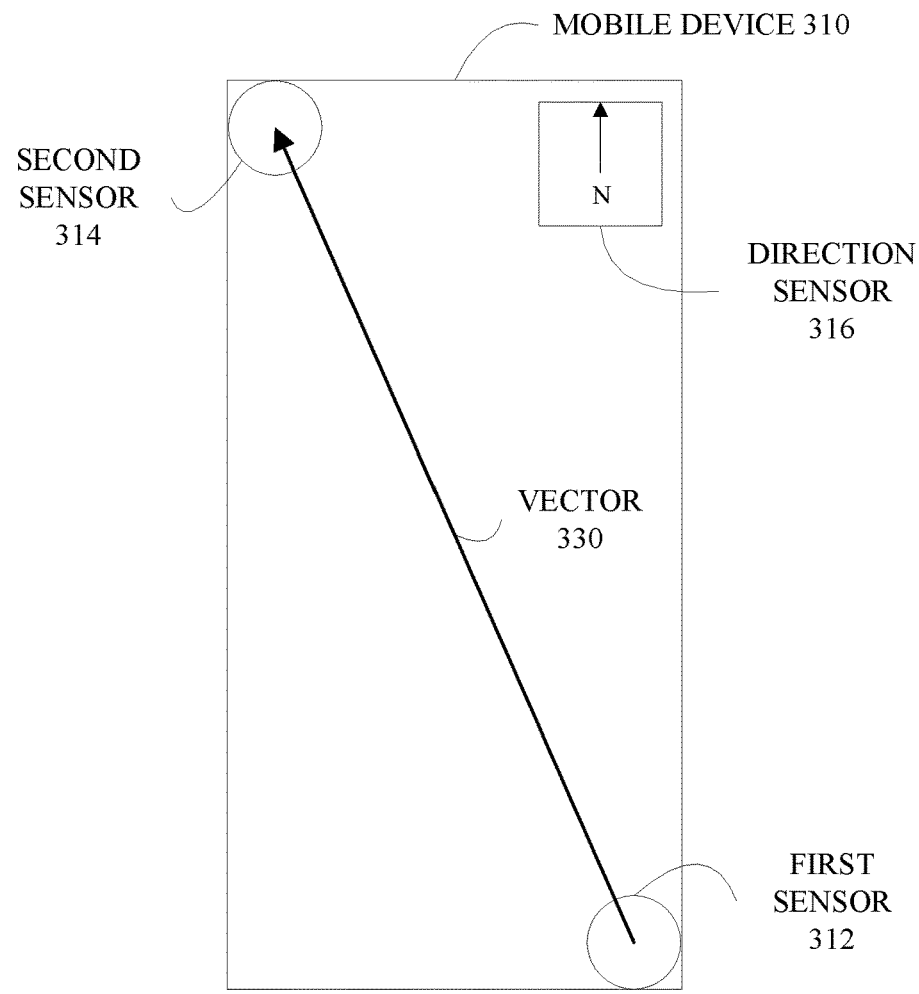
FIG. 3B is a visual representation of various operations of FIG. 2.

FIG. 3B depicts an expanded view of mobile device 310. Mobile device 310 includes first sensor 312, second sensor 314, direction sensor 316, and vector 330. Mobile device 310, first sensor 312, second sensor 314, and direction sensor 316 are as previously disclosed. Although FIG. 3B illustrates mobile device 310 having a rectangular shape, with first sensor 312 in one corner and second sensor 314 in an opposite corner, mobile device 310 can have different shapes and first sensor 312 and second sensor 314 can be oriented in different positions relative to one another.

Vector 330 is a visual representation of the vector defined in 206. Mathematically, vector 206, v, can be defined as v:=q−p. The distance between q and p is known. It is known because the first sensor 312 and second sensor 314 are embedded in fixed locations within mobile device 310. The direction of vector 330 is determined with use of direction sensor 316. Although vector 330 is shown directed from first sensor 312 to second sensor 314, embodiments exist having vector 330 instead pointing from second sensor 314 to first sensor 312.

Referring again to FIG. 2, in 208, location detection manager 102 calculates a plurality of potential locations of mobile device 310. In some embodiments, the plurality of potential locations is calculated in a two-dimensional plane. The starting point of the calculation is the three known values $\|p\|$, $\|q\|$, and v defined as v:=q−p. As previously stated, q is located on second circle 328, where second circle 328 is defined as $C_2:=\{x\in\mathbb{R}^2:\|x\|=\|q\|\}$. This means q is within the set of numbers that make up the Euclidian plane $\mathbb{R}^2$ that constitute a circle, wherein the circle is second circle 328. Solving v:=q−p for q shows $q\in C_1:=\{x+v:\|x\|=\|p\|, x\in\mathbb{R}^2\}$. This means, q is also an element of first circle 324 when the origin of the first circle 324 is shifted (e.g., displaced) by vector 330.

Moving the center of first circle 324 by distance $\|v\|$, as a trivial consequence of the triangle inequality, shows $\|C_1\cap C_2\|\geq 1$ and by the reverse triangle inequality $\|C_1\cap C_2\|<3$, where $\cap$ means the intersection of two sets. The triangle inequality states that for any triangle, the sum of the lengths of any two sides must be greater than or equal to the length of the remaining side. Thus, in a two-dimensional plane, there are 1 or 2 points of intersection of the two circles. Since the sensor must be on both circles, the points of intersection are the potential locations.

Figure 3C:
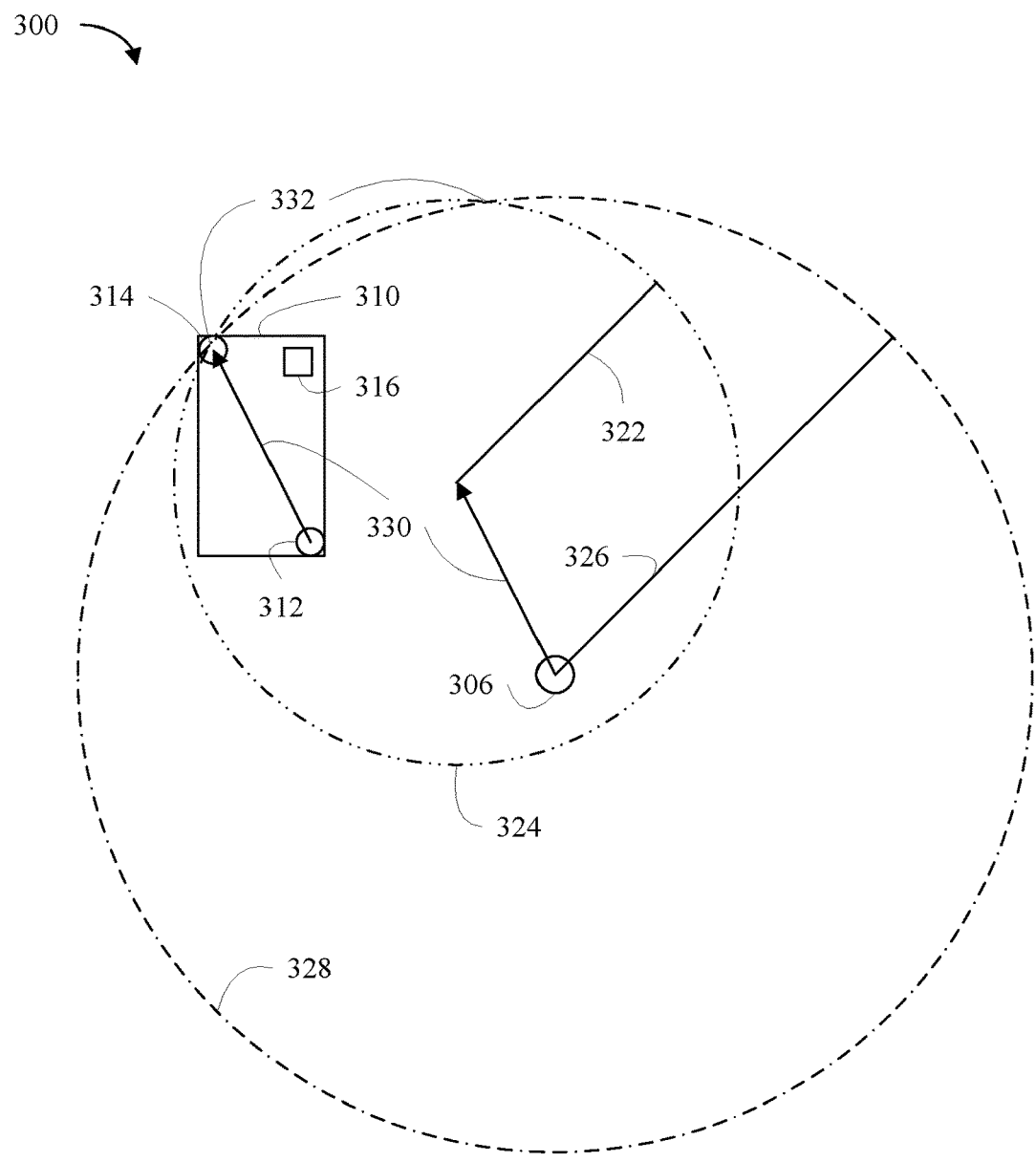
FIG. 3C is a visual representation of various operations of FIG. 2.

FIG. 3C depicts a visual representation of 208. FIG. 3C includes beacon 306, mobile device 310, first sensor 312, second sensor 314, direction sensor 316, first distance 322, first circle 324, second distance 326, second circle 328, and vector 330. FIG. 3C also shows a plurality of potential locations labeled as 332. As shown above, at least one sensor of mobile device 310 must be on the shifted first circle 324 and second circle 328, it follows the location(s) at which the two circles have a common location are the possible potential locations.

Equation 1 illustrates a standard exercise in plane geometry:

$$c_1 \cap c_2 = \left\{a\frac{v}{\|v\|} \pm h\frac{v^\perp}{\|v\|}\right\} \text{ where}$$
$$a = \frac{\|p\|^2 - \|q\|^2 + \|v\|^2}{2\|v\|^2} \text{ and}$$
$$h^2 = \|p\|^2 - a^2.$$

Equation 1

Thus, Equation 1 demonstrates that there is an efficient way to calculate the plurality of potential locations 332.

In some embodiments, the plurality of potential locations is calculated in a three-dimensional environment. In three dimensions, the potential locations of the sensor will be located on a sphere, where the sphere has a radius equal to the distance between the beacon and the sensor. When two spheres intersect, it creates a circle of potential locations. In these embodiments, a subset of the plurality of potential locations can be calculated. In some embodiments, the plurality of potential locations calculated can be based on a predefined number of potential locations. In some embodiments, the plurality of potential locations calculated can be based on a random selection of potential locations. In some embodiments, the plurality of potential locations calculated can be based on a predefined distance. For example, the plurality of potential locations can be one potential location every 5 feet along the circumference of the circle of potential locations.

In some embodiments the predefined number of potential locations can be based on a map. The map can include data about exterior walls, interior walls, common areas, number of stories, private areas, furniture, and other similar data. In some embodiments, the circle of potential locations is compared against the map. In these embodiments, the plurality of potential locations can be a set number of points per story. In some embodiments, the plurality of potential location can be limited to locations within the exterior walls. In some embodiments, the plurality of potential location can be limited to the locations that are considered accessible areas.

Referring again to FIG. 2, in 210, location detection manager 102 records the plurality of potential locations. In some embodiments, the plurality of potential locations is stored in mobile device 110. In some embodiments, the plurality of potential locations is stored in location detection manager 102. In some embodiments, the plurality of potential locations is stored in potential location information 432, which will be discussed in relation to FIG. 4. In some embodiments, the time at which the calculations are completed are recorded with the plurality of potential locations.

In 212, location detection manager 102 determines if at least two of the plurality of potential locations have been calculated. In some embodiments, the number of pluralities of potential locations is determined by seeing how many potential locations have been recorded. In some embodiments the number of pluralities of potential locations is determined by checking the number of calculations that are recorded. If a first plurality of potential locations is recorded, and no subsequent plurality of potential locations is recorded, then location detection manager 102 will return to 202 (decision step "YES" branch). If two or more pluralities of potential locations have been calculated, then location detection manager 102 will proceed to 214 (decision step "NO" branch).

In 214, location detection manager 102 obtains movement data of mobile device 110. In some embodiments the movement data includes a history of all movement detected by movement sensor 118. In some embodiments the movement data includes a history of all movement detected by direction sensor 116. In some embodiments, movement data is continuously recorded in potential location information 432. In some embodiments, the movement data is obtained at predefined time intervals. In some embodiments, the movement data is obtained between the times location detection manager 102 is calculating a first plurality of potential locations and a second plurality of potential locations.

At 216, location detection manager 102 attempts to determine the actual location of mobile device 110. If the actual location can be determined, then location detection manager 102 proceeds to 218 (decision step "YES" branch). If the actual location cannot be determined or if the location is to be continuously monitored, then location detection manager 102 returns to 202 (decision step "NO" branch) to gather more data.

In some embodiments, location detection manager 102 attempts to determine the actual location by calculating the probability of each of the recorded plurality of potential locations. In these embodiments, the location with the highest probability is the most likely to be the actual location. In some embodiments, the actual location is the location with the highest probability of being the actual location. In some embodiments, the actual location is a location where the probability if above a pre-defined threshold.

In some embodiments, location detection manager 102 attempts to determine the actual location by comparing the plurality of potential locations to a map. In some embodiments, the map contains data related to the vicinity surrounding mobile device 110. In some embodiments, the map is for a building. In these embodiments, the map of the building can be stored in location detection manager 102. In some embodiments, the map can be differentiated into areas based on the likelihood of traffic in those areas. For example, the entrance areas and main thoroughfares of a building are likely to have higher traffic than a boiler room or storage closet. Therefore, in some embodiments, likelihood of traffic in an area can be used as a factor to determine the probabilities of each of the plurality of potential locations being the actual location. In some embodiments, the areas can be defined as accessible or inaccessible. An inaccessible location is a location that cannot be physically accessed, or has limited access. If a plurality of potential locations includes one location in an accessible area and one location in an inaccessible area, then location detection manager 102 can determine the actual location is the accessible location.

In some embodiments, the actual location is one of the most recent plurality of potential locations. In some embodiments, location detection manager 102 attempts to determine the actual location by comparing the most recent plurality of potential locations with a previous plurality of potential locations. It should be noted the below example uses an initial and a first set of data ($L_0$, $L_1$, $t_0$, and $t_1$), however any differing set of variables can be used ($L_n$, $L_m$, $t_n$, and $t_m$). In these embodiments, prior locations can be used, in conjunction with data from movement sensor 118 and direction sensor 116. For example, a first plurality of potential locations includes two potential locations, $L_0$ and $L'_0$ calculated at time $t_0$. After a short time step, $\Delta t$ at $t_1 = t_0 + \Delta t$ a second plurality of potential locations are calculated $L_1$ and $L'_1$. The device underwent one of the following transitions: transition 1, $L_0$ to $L_1$,; transition 2, $L_0$ to $L'_1$; transition 3, $L'_0$ to $L_1$; or transition 4, $L'_0$ to $L'_1$. The relative distance traveled between each potential transition can then be divided by $\Delta t$ to calculate an average velocity. Information taken from the device related to device movement can then be compared to the average velocities to determine which movements align most closely with a potential transition. Continuing the example, after calculating two pluralities of potential locations with a $\Delta t$ of 2 seconds, the transitions show potential movement as follows: $L_0$ to $L_1$ movement of 10 meters or 5 meters per second (m/s), $L_0$ to $L'_1$ has a potential movement of 0 meters or 0 m/s, $L'_0$ to $L_1$ has a potential movement of 3 meters or 1.5 m/s, and $L'_0$ to $L'_1$ has a potential movement of 18 meters or 9 m/s. The movement sensor 118 (e.g. an accelerometer), during that 2 seconds, shows the device was moving at a constant velocity of about 1.3 m/s, therefore the potential transition $L'_0$ to $L_1$ is the most closely related the device movement data.

In some embodiments, the actual location is calculated by eliminating one or more of a plurality of potential locations. In some embodiments, a potential location is eliminated when the probability of that location being the actual location falls below a threshold. For example, if any location has a probability of less than 50% it can be eliminated. In some embodiments, a potential location is eliminated if that potential location is the least likely to be the actual location. In some embodiments, a potential location is eliminated by comparing potential transition data against movement sensor 118 data. In these embodiments, the potential location can be eliminated if the transition data differs from the movement sensor 118 data by a predefined threshold. In these embodiments, the potential location can be eliminated, after ranking the likelihood of each transition being the most correct, if they are below a certain threshold (i.e. bottom half of the ranking). Applying this to the above example, the transitions would be ranked, where highest ranked is the closest to the movement sensor 118 data, transition 3, transition 2, transition 1, then transition 4. Transition 1 and 4 would be eliminated as being in the bottom half.

In some embodiments, location detection manager 102 utilizes maps to calculate the probability of the plurality of potential locations. In these embodiments, access points (i.e. doors and hallways) to different areas of the building are stored with other map data. This data can increase the effectiveness in selecting the actual location. For example, if there is a wall, with no access point nearby, between $L_0$ and $L_1$, and the $\Delta t$ is relatively short, the probability of that transition being the correct transition becomes extremely low.

At 218, location detection manager 102, displays the actual location. In some embodiments the actual location is displayed on mobile device 110. In some embodiments, the actual location is displayed on an input/output device connected to location detection manager 102. In some embodiments, the actual location is displayed as a point on a map. In some embodiments, the actual location is displayed by providing instructions on how to proceed to reach a specified location.

Figure 4:
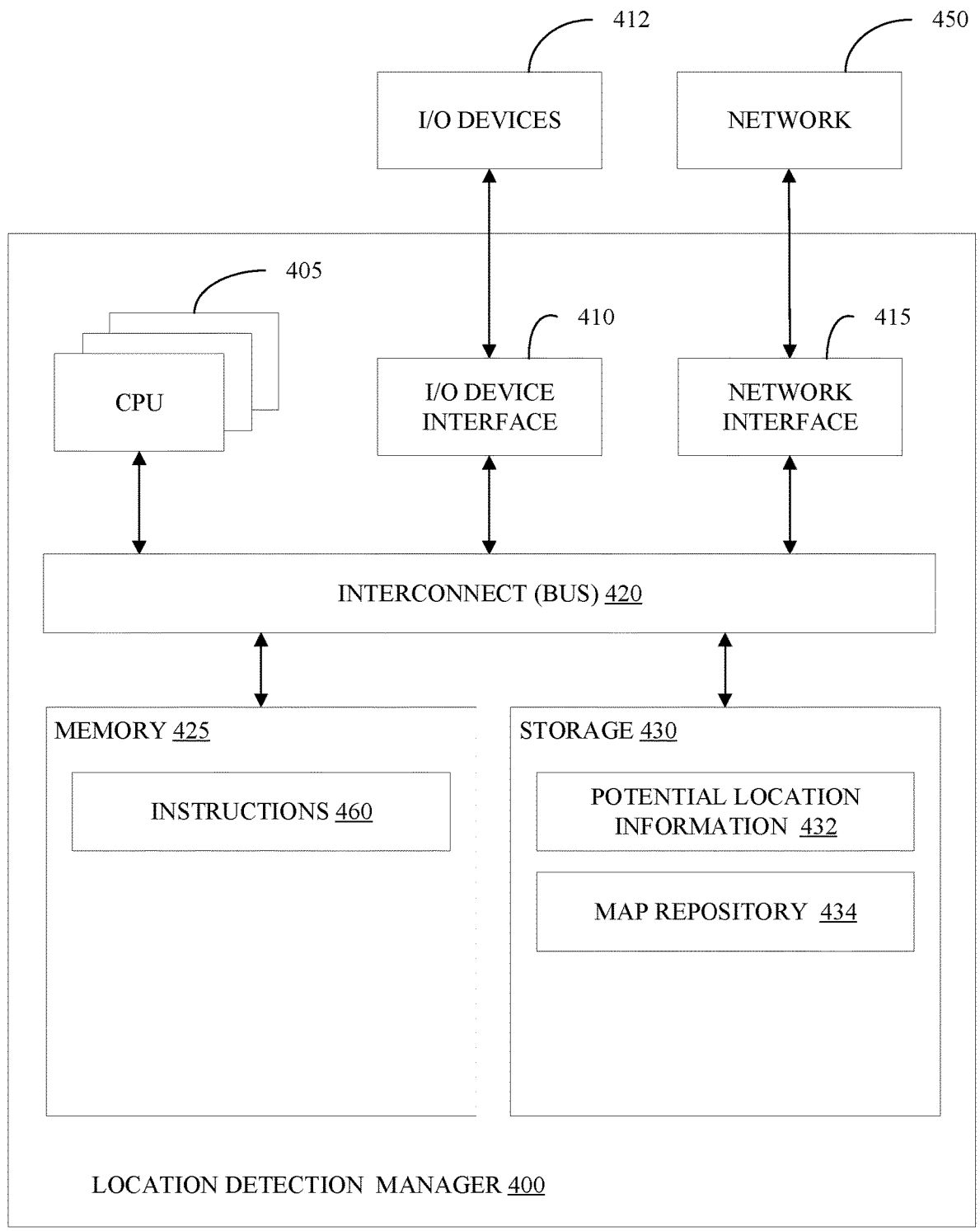
FIG. 4 illustrates a block diagram of an example location detection manager, in accordance with some embodiments of the present disclosure.

FIG. 4 illustrates a block diagram of an example location detection manager 400, in accordance with some embodiments of the present disclosure. In some embodiments, location detection manager 400 is consistent with location detection manager 102. In various embodiments, location detection manager 400 can perform the method 200 as described in FIGS. 2-3. In some embodiments, location detection manager 400 provides instructions for method 200 of FIGS. 2-3 to a client machine such that the client machine executes the method, or a portion of the method, based on the instructions provided by the location detection manager 400.

The location detection manager 400 includes a memory 425, storage 430, an interconnect (e.g., BUS) 420, one or more CPUs 405 (also referred to as processors 405 herein), an I/O device interface 410, I/O devices 412, and a network interface 415.

Each CPU 405 retrieves and executes programming instructions stored in the memory 425 or storage 430. The interconnect 420 is used to move data, such as programming instructions, between the CPUs 405, I/O device interface 410, storage 430, network interface 415, and memory 425. The interconnect 420 can be implemented using one or more busses. The CPUs 405 can be a single CPU, multiple CPUs, or a single CPU having multiple processing cores in various embodiments. In some embodiments, a CPU 405 can be a digital signal processor (DSP). In some embodiments, CPU 405 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 425 is generally included to be representative of a random access memory (e.g., static random access memory (SRAM), dynamic random access memory (DRAM), or Flash). The storage 430 is generally included to be representative of a non-volatile memory, such as a hard disk drive, solid state device (SSD), removable memory cards, optical storage, or flash memory devices. In an alternative embodiment, the storage 430 can be replaced by storage area-network (SAN) devices, the cloud, or other devices connected to the location detection manager 400 via the I/O device interface 410 or a network 450 via the network interface 415.

In some embodiments, the memory 425 stores instructions 460 and the storage 430 stores potential location information 432 and map repository 434. However, in various embodiments, the instructions 460, are stored partially in memory 425 and partially in storage 430, or they are stored entirely in memory 425 or entirely in storage 430, or they are accessed over a network 450 via the network interface 415.

Instructions 460 can be processor-executable instructions for performing any portion of, or all of, any of the methods and/or functionalities discussed in FIGS. 1-3.

Potential location information 432 contains all stored potential locations and the time at which they were taken. In some embodiments, all of the potential transitions are stored for each set of potential locations. In some embodiments, potential location information 432 stores the probability of a potential location calculated at 216.

Map repository 434 stores maps. In some embodiments, the maps can be of a building. In some embodiments, the maps can be of the vicinity surrounding a beacon. In some embodiments, map repository 434 stores information related to high traffic areas and low traffic areas of a building. In some embodiments, map repository 434 stores information related to accessible areas and inaccessible areas of a building. In some embodiments, map repository 434 includes information about movable items, such as desks and other furniture.

In various embodiments, the I/O devices 412 include an interface capable of presenting information and receiving input. For example, I/O devices 412 can present information to a user interacting with location detection manager 400 and receive input from the user.

Location detection manager 400 is connected to the network 450 via the network interface 415. Network 450 can comprise a physical, wireless, cellular, or different network. In some embodiments, network 450 is consistent with network 104.

Embodiments of the present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 460 of FIG. 4 and/or any software configured to perform any subset of the methods and/or functionalities described with respect to FIGS. 1-2 and 3A-3C) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present disclosure can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

What is claimed is:

1. A computer-implemented method comprising:
    calculating a first distance from a beacon to a first sensor at a first time, and wherein the first sensor is embedded in a mobile device;
    calculating a second distance from the beacon to a second sensor at the first time, wherein the second sensor is embedded in the mobile device, and wherein the first sensor and the second sensor are separated by a third distance;
    defining a first vector at the first time, wherein the first vector comprises a direction and a magnitude, wherein the direction points from the first sensor to the second sensor, and wherein the magnitude is equivalent to the third distance;
    calculating a first plurality of potential locations of the mobile device based on the first distance, the second distance, and the first vector; and
    determining an actual location of the mobile device from the first plurality of potential locations.

2. The computer-implemented method of claim 1, further comprising:
    recording the first plurality of potential locations and the first time;
    calculating a fourth distance from the beacon to the first sensor at a second time;
    calculating a fifth distance from the beacon to the second sensor at the second time;
    defining a second vector at the second time;
    determining a second plurality of potential locations based on the fourth distance, the fifth distance, and the second vector;
    obtaining information from a movement device embedded in the mobile device; and
    wherein determining the actual location further comprises:
        analyzing the second plurality of potential locations, the first plurality of potential locations, and the information obtained from the movement device; and
        wherein the actual location is one of the second plurality of potential locations.

3. The computer-implemented method of claim 2, wherein the movement device comprises an accelerometer.

4. The computer-implemented method of claim 1, wherein the vector is based on information from a directional device embedded in the mobile device.

5. The computer-implemented method of claim 4, wherein the directional device comprises a compass.

6. The computer-implemented method of claim 1, wherein the first plurality of potential locations is obtained by calculating points of intersection between a first geometry of potential locations and a second geometry of potential locations;
    wherein the first geometry of potential locations correlates to a first circle, wherein the first circle has a radius equal to the first distance, and wherein the first circle is displaced from an origin by the first vector; and
    wherein the second geometry of potential locations correlates to a second circle, wherein the second circle has a radius equal to the second distance, and wherein the second circle is centered at the origin.

7. The computer-implemented method of claim 1, wherein determining an actual location further comprises:
    comparing the first plurality of potential locations against a map of a building.

8. The computer-implemented method of claim 7, wherein the map includes a plurality of accessible areas, and wherein the actual location corresponds to one of one of the first plurality of potential locations that is within one of the plurality of accessible areas.

9. The computer-implemented method of claim 1, wherein the first plurality of potential locations is obtained by calculating points of intersection between a first geometry of potential locations and a second geometry of potential locations:
  wherein the first geometry of potential locations correlates to a first sphere, wherein the first sphere has a radius equal to the first distance, and wherein the first sphere is displaced from an origin by the first vector; and
  wherein the second geometry of potential locations correlates to a second sphere, wherein the second sphere has a radius equal to the second distance, and wherein the second sphere is centered at the origin.

10. The computer-implemented method of claim 1, wherein the mobile device is rectangular in shape, and wherein the first sensor is located in one corner of the mobile device and the second sensor is located in an opposite corner of the mobile device.

\* \* \* \* \*